July 4, 1961   J. W. MacKAY   2,991,092
PIPE COUPLING HAVING A DOUBLE SEALING ACTION GASKET
Filed July 5, 1957   2 Sheets-Sheet 1

INVENTOR
JACK W. MACKAY
BY Cameron, Kerkam & Sutton
ATTORNEYS

July 4, 1961     J. W. MacKAY     2,991,092
PIPE COUPLING HAVING A DOUBLE SEALING ACTION GASKET
Filed July 5, 1957     2 Sheets-Sheet 2

INVENTOR
JACK W. MACKAY

BY *Cameron, Kerkam & Sutton*
ATTORNEYS

United States Patent Office 2,991,092
Patented July 4, 1961

2,991,092
PIPE COUPLING HAVING A DOUBLE SEALING ACTION GASKET
Jack W. MacKay, Birmingham, Ala., assignor to American Cast Iron Pipe Company, Birmingham, Ala., a corporation of Georgia
Filed July 5, 1957, Ser. No. 670,151
4 Claims. (Cl. 285—110)

This invention relates to pipe joints, couplings and fittings of the socket and spigot type, and to gaskets for use therein, and is particularly directed to the provision of a pipe joint of improved sealing characteristics.

The primary object of the present invention is to provide a socket and spigot type pipe joint embodying a compressible gasket which can be quickly and easily assembled with minimum loads, and after assembly will remain tightly sealed even when subjected to maximum internal fluid pressures and external deflecting loads.

Another object is the provision of a joint of the character described wherein the gasket and gasket-receiving cavity of the socket are so formed as to produce a double sealing action which maintains the joint tight under all conditions of pipe movement and pressure.

A further object of the invention is to provide an improved form of pipe joint gasket which enables pipe to be assembled in deflected position without injury to the gasket and without dislodgment thereof from its proper sealing position.

These and other objects will appear more fully upon consideration of the detailed description of the embodiment of the invention which follows. In this connection, although only one specific form of pipe joint and two forms of gasket are described and illustrated in the accompanying drawings, it is to be expressly understood that these drawings are for purposes of illustration only and are not to be construed as defining the limits of the invention, for which latter purpose reference should be had to the appended claims. It will also be understood that, while the drawings show a joint between two sections of socket and spigot type pipe, the invention is equally applicable to pipe couplings and other fittings which require a fluid-tight joint between a socketed element and a cooperating spigotted element.

In the drawings, wherein like reference characters indicate like parts throughout the several views.

Figure 1:
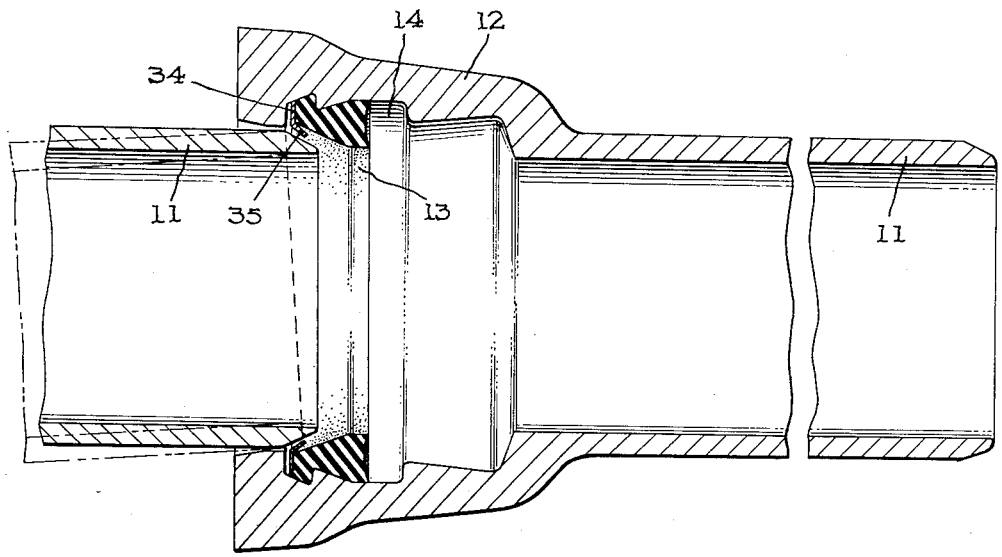
FIG. 1 is a sectional view through the axis of one form of pipe joint embodying the present invention showing the parts prior to assembly.
Figure 2:
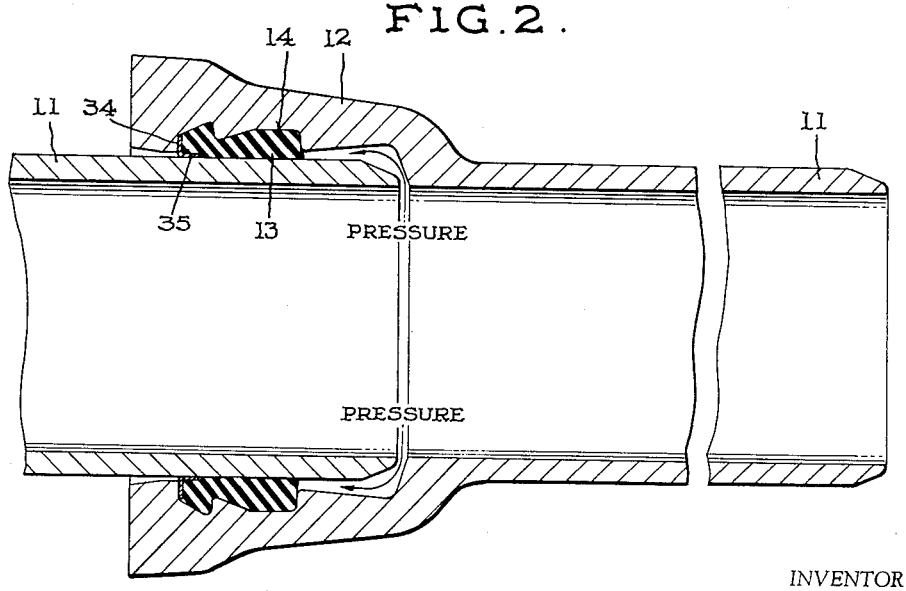
FIG. 2 is a sectional view of the assembled joint.

The joint shown in FIGS. 1 and 2 as exemplary of the invention comprises the spigot 11 of one section of pipe, the socket or bell 12 of the adjacent pipe section, and a compressible gasket 13 which is housed in an annular cavity 14 in socket 12 and is adapted to seal the joint against leakage even under maximum pressure and deflection load conditions.

Figure 3:
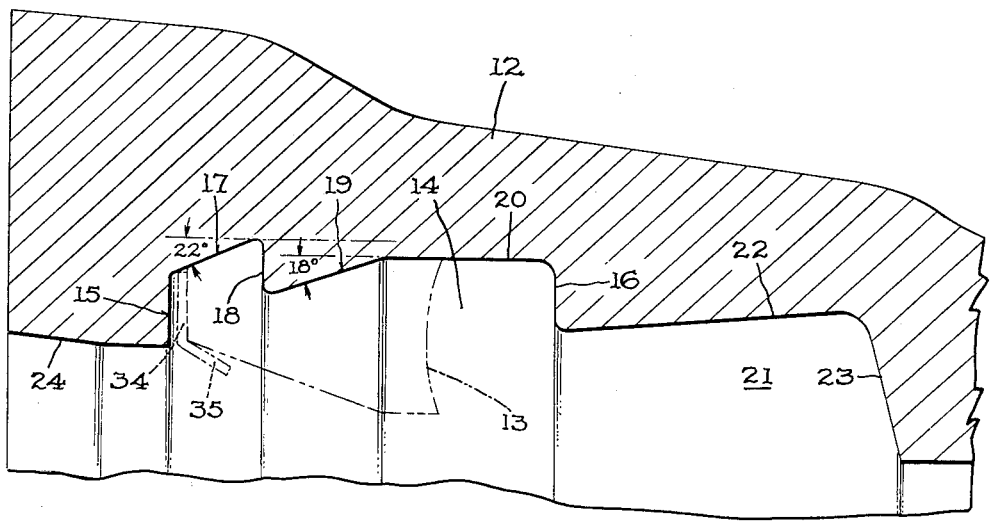
FIG. 3 is an enlarged sectional view of the socketed element of the joint of FIGS. 1 and 2, drawn to scale to indicate the relative dimensions and angularities of the surfaces forming the socket cavity in one specific size and type of joint.

As is shown best in FIG. 3, which is drawn to scale to indicate the relative dimensions and angularities of the surfaces forming the socket of a joint for 6″ pipe, the gasket-receiving cavity 14 of socket 12 is bounded by a front end wall 15 and a rear end wall 16, both of which are substantially perpendicular to the axis of the socket, and a side wall of irregular configuration which comprises a first sloped portion 17 extending rearwardly from front end wall 15 in an axially divergent direction, a shoulder-forming portion 18 extending in a substantially radial direction from the rear edge of first sloped portion 17, a second sloped portion 19 extending rearwardly from the inner edge of shoulder 18 in an axially divergent direction, and a portion 20 extending in a substantially axial direction between the rear edge of second sloped portion 19 and rear end wall 16. The portion of socket 12 inwardly or to the rear of cavity 14 is provided with a spigot-receiving chamber 21 having a sloped side wall 22 and end wall 23, while the outer end or mouth of the socket is also provided with a sloped or flared wall 24.

As will appear hereinafter, the improved sealing characteristics of the joint of the present invention result in part from the relative angularities of first and second sloped portions 17 and 19 of the side wall of cavity 14 and the interposition of shoulder 18 between the rear edge of first sloped portion 17 and front edge of second sloped portion 19. In order to provide the double sealing effect which is distinctive of this joint, the angularity of first sloped portion 17 with respect to the axis of socket 12 is preferably greater than that of second sloped portion 19; for example, as indicated in FIG. 3, it has been found that, in a joint for 6″ pipe, excellent results are obtained when the angularities of the first and second sloped portions are on the order of 22° and 18°, respectively. It should also be noted that the diameter at the rear edge of first sloped portion 17, i.e., at the base of shoulder 18, is greater than the diameter at the rear edge of second sloped portion 19, i.e., the diameter of axially extending portion 20. The relatively deep, substantially radial shoulder thus formed insures that the gasket will be maintained in proper position during assembly of the joint.

Figure 4:
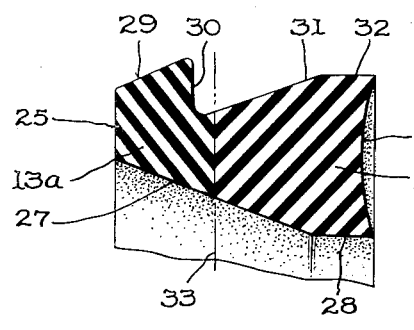
FIG. 4 is a sectional view similar to and on the same scale as FIG. 3 showing the gasket in uncompressed condition.

Referring now to FIG. 4, wherein the gasket 13 is shown in uncompressed condition drawn to the same scale as the socket in FIG. 3, it will be seen that the annular body of the gasket is defined by a front end wall 25 which is substantially perpendicular to the axis of the gasket, a rear end wall 26 which, while generally perpendicular to the gasket axis, is preferably slightly dished or concave in form, an inner side wall made up of a sloped portion 27 extending rearwardly from front end wall 25 in an axially convergent direction and an axially extending portion 28, and an outer side wall having substantially the same irregular configuration as the side wall of socket cavity 14. The outer side wall of the gasket thus comprises a first sloped portion 29 extending rearwardly from front end wall 25 in an axially divergent direction, a shoulder-forming portion 30 extending substantially radially inwardly from the rear edge of first sloped portion 29, a second portion 31 extending rearwardly from the inner edge of shoulder 30 in an axially divergent direction, and a substantially axially extending portion 32, the maximum diameter of first sloped portion 29 being greater than that of second sloped portion 31. The angularities of sloped portions 29 and 31 of the outer side wall are substantially the same as those of sloped portions 17 and 19, respectively, of the side wall of the socket cavity; i.e., on the order of 22° and 18°, respectively, in the joint illustrated.

When in uncompressed condition, the width or axial dimension of gasket 13 between front end wall 25 and rear end wall 26 is less than the width of socket cavity 14 so that, when the gasket is initially inserted in the cavity as shown in FIG. 1, there will be sufficient clearances between the front and rear end walls of the gasket and the end walls of the cavity to accommodate the mass of the gasket when it is redistributed as a result of the pressures produced during assembly of the joint and when the pipe line is placed in service. On the other hand, the outside diametral dimensions of the gasket when uncompressed are slightly greater than the corresponding dimensions of cavity 14 so that the gasket will always have a compressed fit against the side wall of the cavity. The inside diameter of the uncompressed gasket is greater than the outside diameter of spigot 11 at the front edge of sloped portion 27 of the inner side wall, but becomes progressively smaller toward the rear end of the gasket until, at the rear edge of sloped portion 27, it is considerably less than the spigot diameter.

As is indicated by the crosshatching in FIG. 4, the body of gasket 13 is preferably made of compressible material, such as rubber, of two different degrees of hardness, the front part 13a forwardly of shoulder 30, including the shoulder-forming portion, being harder and more resistant to compression and flow than the rear part 13b. For example, all of the gasket forwardly of the radially extending plane indicated at 33 in FIG. 4 may be made of rubber having a Shore "A" durometer hardness of about 85 to 90, while the part to the rear of plane 33 is made of rubber having a Shore "A" durometer hardness of about 50 to 65. Although the plane 33 which divides the hard and soft parts of the gasket may be coplanar with shoulder-forming portion 30 of the outer side wall of the gasket, it is preferably located slightly to the rear of the fillet at the base of the shoulder, the object being to insure that all portions of the outer wall of the gasket which contact the first sloped portion 17 and shoulder-forming portion 18 of the side wall of socket cavity 14 are made of the relatively harder, less compressible material.

In assembling the joint, the gasket 13 is first seated in cavity 14 of socket 12 in the position shown in FIG. 1. The spigot 11 is then forced inwardly into the socket, contacting first the sloped portion 27 and then the axially extending portion 28 of the inner side wall of the gasket and compressing the gasket in a radial direction with a consequent expansion or flow of the rubber in an axial direction, particularly in the rear part 13b which is made of the relatively softer rubber. The relatively harder front part 13a abutting the first sloped portion 17 and shoulder-forming portion 18 of the side wall of cavity 14 provides a strong anchorage which prevents displacement of the gasket from its proper sealing position, while the forward, hard rubber part of sloped portion 27 of the inner side wall provides a tear or abrasion resistant surface effective to guide the spigot 11 into engagement with the rear, soft rubber part 13b which initially seals the joint. This construction permits even a square end spigot to be assembled in deflected position (as indicated in broken lines of FIG. 1) without injury to or dislodgment of the gasket. The angularity of sloped portion 27 enables the assembly to be made under minimum load.

When the joint has been assembled and the pipe line is placed in service, the pressure of the fluid in the pipe is exerted against rear end wall 26 of gasket 13 and produces an unusually tight seal between spigot 11 and socket 12 due to the double wedging action of the two sloped portions of the gasket against the corresponding portions of the inner wall of socket cavity 14. As indicated in FIG. 2, the internal pressure forces the soft part 13b of the gasket outwardly or to the left as viewed in the figure with a resultant stuffing box effect between second sloped portion 19 of the cavity wall and the outer surface of spigot 11. This pressure also produces a slight flow or movement of the soft part of the gasket toward the mouth of socket 12 which is in turn transmitted to the hard part 13a and causes the first sloped portion 29 of the outer side wall thereof to be more tightly wedged against first sloped portion 17 of the cavity wall. There is thus produced a double seal between the sloped portions of the outer side wall of the gasket and the corresponding portions of the inner wall of the socket cavity. Due to the greater angularity of the first sloped portions 17 and 29 and the greater hardness of the front part 13a of the gasket, the latter becomes immobilized in the position indicated in FIG. 2 under normal conditions of internal pressure and further flow of the soft part 13b is prevented by the harder front part. Consequently, abnormally high pressures due to water hammer or pressure surges in the line will not cause leakage, but will simply increase the tightness of the joint seal.

In the event that a deflecting load should be applied while the pipe is in service, the portions of the gasket located at the points where the deflection operates to increase the clearance between the spigot 11 and socket 12 are capable of adjusting position under the effect of the internal pressure and maintaining or reestablishing the desired tightness of seal in a manner similar to that in which sealing is established and maintained as above described when the pipe line is initially placed under pressure.

When the joint of the present invention is used in pipe lines or other installations in climate where it may be necessary to pass an electrical current through the line for thawing purposes, or when it is desired to electrically bond the spigot and socket members of the joint for any other reason, the joint may be provided with a conductive bonding member adapted to make electrical contact with both spigot 11 and socket 12.

As shown in FIGS. 1 and 2, the bonding member may consist of a ring 34 of lead or other readily deformable conductive material, substantially L-shaped in cross section, which is inserted in the socket cavity 14 between front end wall 15 of the latter and front end wall 25 of gasket 13. The flange portion 35 of ring 34 initially extends at an obtuse angle with respect to the body of the ring so that the latter may fit over the front end portion of the gasket defined by end wall 25 and sloped portion 27 of the inner side wall. When the joint is assembled, the outer surface of spigot 11 engages flanged portion 35 of ring 34 and forces it against the inner side wall of the gasket into a position wherein it is substantially perpendicular to the body of the ring, as indicated in FIG. 2. At the same time, the front end of gasket 13 forces the body of the ring against front end wall 15 of socket cavity 14, the periphery of the ring also being in engagement with first sloped portion 17 of the cavity side wall. Ring 34 thus makes electrical contact with both the spigotted and socketed elements of the joint.

Figure 5:
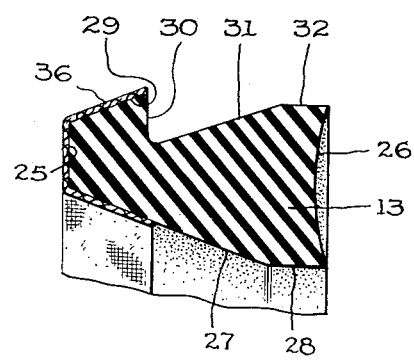
FIG. 5 is a sectional view similar to FIG. 4 of a modified form of gasket.

Although a gasket made of material having two different degrees of hardness has been found to provide an exceptionally tight seal in joints embodying the present invention, a gasket of uniform hardness throughout may also be used, particularly if the front end of the gasket is provided with an external fabric reinforcement. Such a modified form of gasket is shown in FIG. 5 wherein front end wall 25, the front part of sloped portion 27 of the inner side wall and first sloped portion 29 of the outer side wall are provided with a covering 36 of duck or other suitable reinforcing fabric adherent to the rubber of the gasket 13.

There is thus provided by the present invention an improved joint for socket and spigot type pipe, couplings and fittings embodying a compressible gasket and a gasket-receiving cavity in the socketed element of novel construction which cooperate to produce a joint which will remain tightly sealed irrespective of variations in internal pressure or deflection producing external loads. Pipe joints embodying the invention may be easily assembled with a minimum amount of compression of the gasket and without injury thereto, even with the pipe in deflected position, and will remain tight under conditions which produce leakage in joints of the same general type heretofore known.

Although only one specific form of joint and two forms of gasket embodying the invention have been described and illustrated in the accompanying drawings, it will be obvious that the invention is not limited to the exact structures shown, but is capable of a variety of mechanical embodiments. Various changes, which will now suggest themselves to those skilled in the art, may be made in the structural details, dimensions, and angularities of the elements of the joint, and in the specific character of the materials used in making the gasket, without departing from the inventive concept. Reference is therefore to be had to the appended claims for a definition of the limits of the invention.

What is claimed is:

1. A joint for socket and spigot type pipe, couplings and fittings, comprising a spigotted element, a cooperating socketed element receiving said spigotted element and having an annular gasket-receiving cavity therein adjacent the open end thereof, and a single, unitary, annular rubber gasket seated in said cavity with its front end adjacent the open end of said socketed element, said cavity being bounded by front and rear end walls extending toward the axis of said socketed element and a side wall which includes a first sloped portion extending rearwardly from the front end wall in an axially divergent direction, a shoulder positioned rearwardly of said first sloped portion and extending radially inwardly substantially perpendicular to the axis of said socketed element and a second sloped portion extending rearwardly from the radially inner edge of said shoulder in an axially divergent direction, the angularity of said first sloped portion with respect to the axis of said socketed element being greater than that of said second sloped portion, said gasket having front and rear end walls, an outer side wall which includes first and second sloped portions and a shoulder of substantially the same configuration as the corresponding portions of the side wall of said socket cavity, and an inner side wall which, prior to assembly of the joint, extends rearwardly from the front end wall of the gasket in an axially convergent direction, the part of said gasket rearwardly of the shoulder thereof being made of softer rubber than the front part and having a radial thickness between the outer and inner side walls thereof which, prior to assembly of the joint, is greater than the radial clearance between the wall of said socket cavity and the outer surface of said spigotted element, whereby the outer and inner walls of said gasket are pressed into sealing contact with the wall of said socket cavity and the outer surface of said spigotted element, respectively, when the joint is assembled, at least a portion of the front part of said gasket also being radially compressed between the side wall of said socket cavity and the outer surface of said spigotted element, and the rear end wall of said gasket being exposed to the pressure of the fluid within the pipe when the joint is assembled, whereby fluid pressure within the pipe exerted against said rear end wall forces the rear part of said gasket forwardly to produce a first wedge-type seal between the second sloped portions of the side walls of said gasket and cavity, and is also transmitted to the front part of the gasket by the rear part to produce a second wedge-type seal between the first sloped portions of the side walls of said gasket and cavity.

2. A joint as defined in claim 1 wherein the volumes of said socket cavity and said gasket rearwardly of the shoulders thereof are greater than the volumes forwardly of said shoulders, and the lengths of the second sloped portions of said side walls which are in sealing contact with one another are greater than those of said first sloped portions.

3. A joint as defined in claim 1 wherein the diameter of said socket cavity at the rear edge of the first sloped portion of the side wall thereof is greater than the diameter at the rear edge of the second sloped portion of said side wall, and the diameter of the radially inner edge of the shoulder of said socket cavity is less than the diameter of said cavity at the forward edge of the first sloped portion of the side wall thereof, whereby a relatively deep shoulder is formed for preventing displacement of the gasket during assembly of the joint.

4. A joint as defined in claim 1 wherein the angularities of the first and second sloped portions of the side walls of said socket cavity and gasket are on the order of 22° and 18°, respectively.

References Cited in the file of this patent
UNITED STATES PATENTS

| | | |
|---|---|---|
| 811,632 | Graham | Feb. 6, 1906 |
| 1,758,455 | McWane | May 13, 1930 |
| 1,856,580 | Mitchell | May 3, 1932 |
| 1,955,832 | Raybould | Apr. 24, 1934 |
| 1,979,141 | Clark et al. | Oct. 30, 1934 |
| 2,116,705 | Marx et al. | May 10, 1938 |
| 2,245,154 | McWane | June 10, 1941 |
| 2,519,436 | Cadman | Aug. 23, 1950 |
| 2,589,876 | Sesher | Mar. 18, 1952 |
| 2,953,398 | Haugen et al. | Sept. 20, 1960 |
| 2,966,539 | Sears et al. | Dec. 27, 1960 |

FOREIGN PATENTS

| | | |
|---|---|---|
| 469,480 | Great Britain | July 27, 1937 |

OTHER REFERENCES

Tyton joint for use on cast iron pipe; published by Underwriters Laboratories, Inc.; dated Oct. 29, 1956.